United States Patent
AlOtaibi

(10) Patent No.: US 11,378,198 B2
(45) Date of Patent: Jul. 5, 2022

(54) VALVE BONNET ACCESSORY

(71) Applicant: SAUDI ARABIAN OIL COMPANY, Dhahran (SA)

(72) Inventor: Mansour Bandar AlOtaibi, Houfuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/950,079

(22) Filed: Nov. 17, 2020

(65) Prior Publication Data

US 2022/0154839 A1    May 19, 2022

(51) Int. Cl.
  *F16K 27/12*    (2006.01)
  *F16K 27/02*    (2006.01)

(52) U.S. Cl.
  CPC .............. *F16K 27/12* (2013.01); *F16K 27/02* (2013.01)

(58) Field of Classification Search
  CPC .......... F16K 27/00; F16K 27/02; F16K 27/04; F16K 27/0281; F16K 27/12; F16K 31/14; F16K 31/143; F16K 31/145
  USPC ....... 137/376, 377, 378, 379, 380, 381, 382, 137/382.5; 251/319, 320, 321, 322, 323
  See application file for complete search history.

(56) References Cited

U.S. PATENT DOCUMENTS

| | | | | |
|---|---|---|---|---|
| 105,115 A | * | 7/1870 | Moorhead | F16K 21/04 137/540 |
| 956,704 A | * | 5/1910 | Hepler | F16K 27/02 251/155 |
| 2,699,680 A | * | 1/1955 | Ferguson | G01N 1/12 73/864.61 |
| 2,930,397 A | * | 3/1960 | Albert | F16K 1/307 137/382 |
| 3,314,646 A | * | 4/1967 | Anderson | F16K 31/44 251/285 |
| 3,448,771 A | * | 6/1969 | Bales, Jr. | F16K 27/07 137/341 |
| 4,562,860 A | * | 1/1986 | Walter | F16K 5/0636 137/454.6 |

(Continued)

FOREIGN PATENT DOCUMENTS

| | | |
|---|---|---|
| CN | 203847778 U | 9/2014 |
| CN | 107631060 A | 1/2018 |

*Primary Examiner* — Kevin F Murphy
*Assistant Examiner* — Jonathan J Waddy
(74) *Attorney, Agent, or Firm* — Osha Bergman Watanabe & Burton LLP

(57) ABSTRACT

A valve bonnet has an elongated cavity to accommodate a spring-loaded valve stem, an upper surface, and tapped holes exposed at the upper surface. A bonnet accessory for the valve bonnet includes a fixture plate with holes formed in a predetermined hole pattern that matches a hole pattern of the tapped holes of the bonnet. The bonnet accessory includes threaded fasteners, each of which has a length to position the fixture plate at a predetermined height above the upper surface of the bonnet. The threaded fasteners have first ends to threadedly engage the tapped holes on the bonnet and second ends aligned with the holes in the fixture plate and retained on the fixture plate. The bonnet accessory includes a loop fastener that is retained on the fixture plate. The bonnet may be lifted by applying a pull force to a loop portion of the loop fastener.

20 Claims, 12 Drawing Sheets

(56) References Cited

U.S. PATENT DOCUMENTS

| | | | | |
|---|---|---|---|---|
| 4,605,036 | A * | 8/1986 | Smith | F16K 5/0435 |
| | | | | 137/327 |
| 4,718,495 | A * | 1/1988 | Lubitz | E21B 33/02 |
| | | | | 166/120 |
| 5,671,902 | A * | 9/1997 | Gauthiere | F16K 27/07 |
| | | | | 251/319 |
| 6,450,477 | B1 * | 9/2002 | Young | F16K 31/1262 |
| | | | | 251/285 |
| 8,695,627 | B2 * | 4/2014 | Kugelev | E21B 19/00 |
| | | | | 137/363 |
| 9,746,095 | B2 * | 8/2017 | Kinser | F16K 27/041 |
| 2010/0072409 | A1 * | 3/2010 | Hancock | F16K 17/0413 |
| | | | | 251/321 |
| 2012/0211090 | A1 * | 8/2012 | Downer | B08B 9/00 |
| | | | | 137/15.01 |
| 2012/0261890 | A1 * | 10/2012 | Hageman | F16J 13/10 |
| | | | | 277/638 |
| 2019/0331251 | A1 * | 10/2019 | Taylor | F16K 31/1221 |
| 2020/0271236 | A1 | 8/2020 | Meshaikhis et al. | |

* cited by examiner

VALVE BONNET ACCESSORY

BACKGROUND

Spring-loaded pressure relief valves are commonly used to prevent pressure from rising above a safe limit within a system. FIG. 1 shows an example of a conventional spring-loaded pressure relief valve 100 including a valve body 102 having an inlet port 104 and an outlet port 106. An inlet nozzle 108 is positioned at inlet port 104 to allow fluid communication between the valve and a system whose pressure is to be controlled. Above inlet nozzle 108 is a poppet 110 including a sealing disc 112 and a disc holder 114. A valve stem 116 is arranged in contact with an end of disc holder 114. Valve stem 116 is loaded by spring 118. The compression of spring 118, and hence the set pressure at which the valve operates, can be adjusted by an adjusting screw 120. While a system pressure at inlet port 104 is below the set pressure, sealing disc 112 engages the top of inlet nozzle 108 and closes the valve. When the system pressure at inlet port 104 exceeds the set pressure, sealing disc 112 lifts off inlet nozzle 108, opening the valve and allowing pressure to be released from the system through the valve. The valve closes back when the system pressure at inlet port 104 falls below the set pressure. A balanced-bellows pressure relief valve is similar in construction to the spring-loaded pressure relief valve and further includes bellows to minimize the effect of back pressure on the valve. One example of a balanced-bellows pressure relief valve is described in U.S. Patent Application Publication No. 2020/0271236 (Meshaikhis et al.).

In the example spring-loaded pressure relief valve 100 shown in FIG. 1, a bonnet 122 is mounted on top of valve body 102, typically using bolts. Spring 118 and valve stem 116 are disposed inside bonnet 122. Adjusting screw 120 projects above bonnet 122 and is covered by a cap 124, which is attached to the top of bonnet 122. Bonnet 122 has an elongated cavity to accommodate spring-loaded valve stem 116 at a position above valve body 102. The elongated structure of the bonnet along with the overall weight of the valve can complicate handling of the valve. In this regard, hoisting equipment is typically required to handle the valve when the valve is to be installed in or removed from an elevated location within a plant or a valve testing shop. A common method of attaching the hoisting equipment to the valve involves wrapping a lifting sling around the valve and then hanging the lifting sling on a hook of the lifting equipment. If the lifting sling is not wrapped correctly, there is the risk of the valve swinging while in the sling or slipping out of the sling, which can be catastrophic, e.g., causing damage to nearby equipment and injuring personnel. An experienced and skilled rigger is typically required to ensure proper wrapping of the lifting sling around the valve as well as to ensure that the center of mass and the center of gravity of the valve are substantially aligned.

SUMMARY

In a first summary example, a bonnet accessory includes a fixture plate that in use is positioned above an upper surface of a valve bonnet. The valve bonnet includes a plurality of tapped holes that are exposed at the upper surface and an elongated cavity to accommodate a spring-loaded valve stem. The fixture plate has an inner area and an outer area circumscribing the inner area. A plurality of outer area holes are formed in the outer area. At least a number of the plurality of outer area holes are arranged to form a predetermined hole pattern that matches a hole pattern of the plurality of tapped holes. The bonnet accessory includes a plurality of threaded fasteners, each of which has a length to position the fixture plate at a predetermined height above the upper surface of the valve bonnet. The plurality of threaded fasteners have first ends to threadedly engage the plurality of tapped holes and second ends aligned with the outer area holes and retained on the outer area of the fixture plate. The bonnet accessory includes a loop fastener retained on the inner area of the fixture plate. A loop portion of the loop fastener is positioned above the fixture plate.

In the first summary example, the loop fastener may be an eye bolt.

In the first summary example, at least one inner area hole may be formed in the inner area. The loop fastener may have a stem portion that threadedly engages with the at least one inner area hole. The at least one inner area hole may be located on an axial axis of the fixture plate, or at a geometric center of the fixture plate.

In the first summary example, the predetermined hole pattern may be a circular pattern. In some cases, the predetermined hole pattern may be symmetrical about a plane intersecting the fixture plate.

In the first summary example, the fixture plate may have a circular shape.

In the first summary example, the second ends of the fasteners may be inserted through the outer area holes. A plurality of nuts may be threadedly engaged with the second ends to retain the second ends on the outer area of the fixture plate.

In the first summary example, the length of each of the plurality of threaded fasteners may be in a range from 12 inches to 20 inches (or from 30 cm to 51 cm).

In a second summary example, an assembly includes a valve bonnet having an elongated cavity to accommodate a spring-loaded valve stem. The valve bonnet has an upper surface and a plurality of tapped holes exposed at the upper surface. The assembly includes a bonnet accessory that is releasably attached to the valve bonnet. The bonnet accessory includes a fixture plate having an inner area and an outer area circumscribing the outer area. A plurality of outer area holes are formed in the outer area. At least a number of the plurality of outer area holes are arranged to form a predetermined hole pattern that matches a hole pattern of the plurality of tapped holes. The accessory includes a plurality of threaded fasteners. Each threaded fastener has a length that positions the fixture plate at a predetermined height relative to the upper surface of the valve bonnet. The plurality of threaded fasteners have first ends that are threadedly engaged with the tapped holes and second ends that are aligned with the outer area holes and retained on the outer area of the fixture plate. The bonnet accessory includes a loop fastener that is retained on the inner area of the fixture plate. A loop portion of the loop fastener is positioned above the fixture plate.

In the second summary example, the loop fastener may be an eye bolt.

In the second summary example, at least one inner area hole may be formed in the inner area. The loop fastener may have a stem portion that threadedly engages with the at least one inner area hole.

In the second summary example, the predetermined hole pattern may be a circular pattern. In some cases, the predetermined hole pattern may be symmetrical about a plane intersecting the fixture plate.

In the second summary example, the fixture plate may have a circular shape.

In the second summary example, a cap may extend above the upper surface of the valve bonnet and may be coupled to the valve bonnet. The predetermined height may be selected to position the fixture plate above the cap.

In the second summary example, the second ends of the threaded fasteners may be inserted through the outer area holes. A plurality of nuts may threadedly engage with the second ends to retain the second ends on the outer area of the fixture plate.

In the second summary example, the valve bonnet may be coupled to a valve body of a spring-loaded pressure relief valve.

In a third summary example, a method includes threadedly engaging first ends of a plurality of threaded fasteners with a plurality of tapped holes exposed at an upper surface of a valve bonnet. The valve bonnet has an elongated cavity to accommodate a spring-loaded valve stem. The method includes aligning a plurality of holes formed in a fixture plate with second ends of the plurality of threaded fasteners. The method includes installing a plurality of nuts on the second ends of the plurality of threaded fasteners to retain the second ends on the fixture plate. The method includes attaching a loop fastener to the fixture plate to position a loop portion of the loop fastener above a center region of the fixture plate.

In the third summary example, the method may include applying a pull force to the loop portion of the loop fastener to lift the valve bonnet and any valve parts attached to the valve bonnet.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
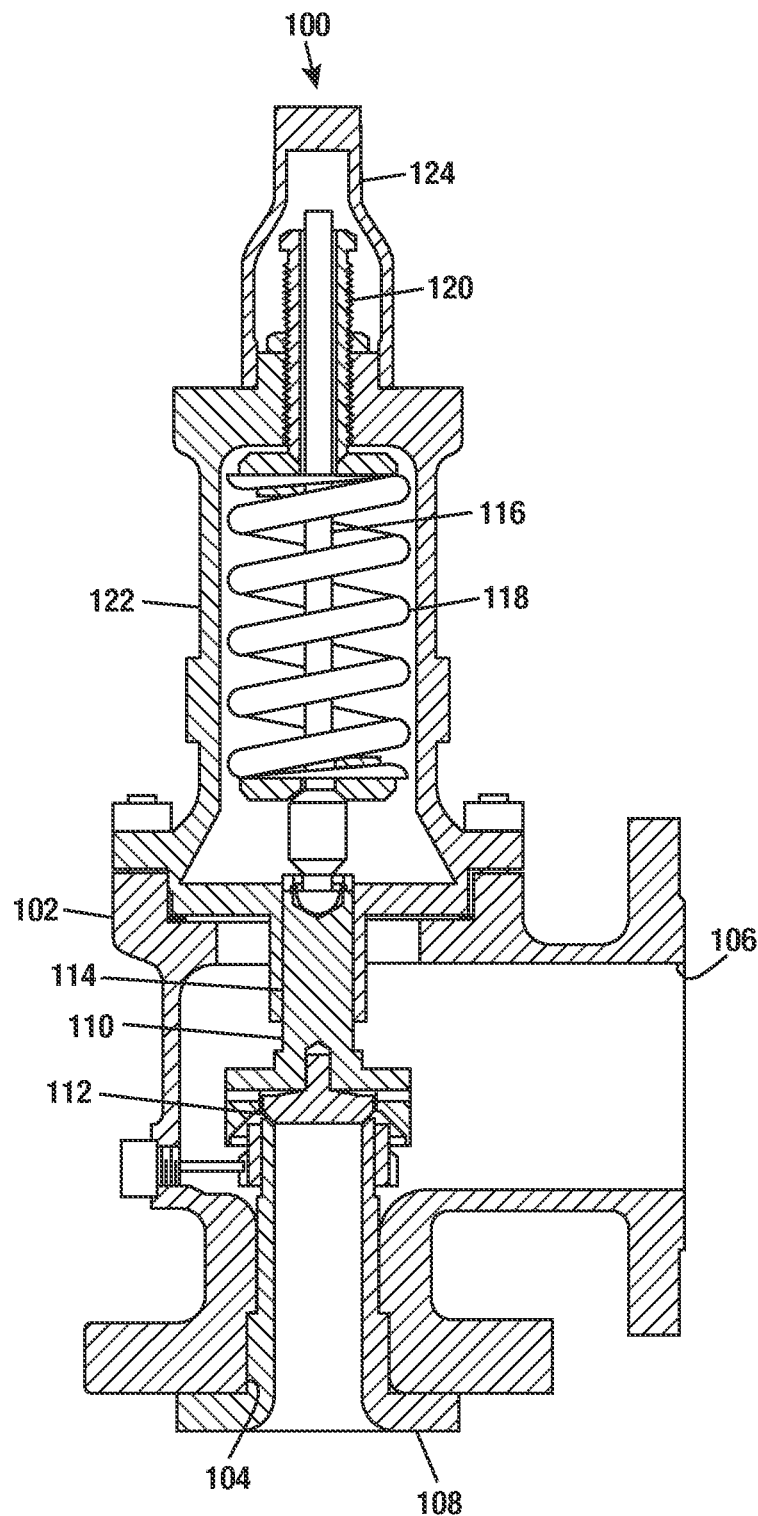
FIG. 1 is a cross-sectional view of a conventional spring-loaded relief valve.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

A bonnet accessory that can be installed on a valve bonnet and used as a connection point for hoisting equipment is described herein. The bonnet accessory enables safe connection of hoisting equipment to the valve bonnet. The bonnet accessory may be installed on the valve bonnet while the valve bonnet is mounted on a valve body or before the valve bonnet is mounted on the valve body. In the latter case, the bonnet accessory may enable safe installation of the valve bonnet on the valve body. The bonnet accessory can be installed on the valve bonnet by making up threaded connections. The bonnet accessory can replace a lifting sling for handling a valve and eliminate the need for an experienced and skilled rigger to wrap the sling around the valve.

Figure 2:
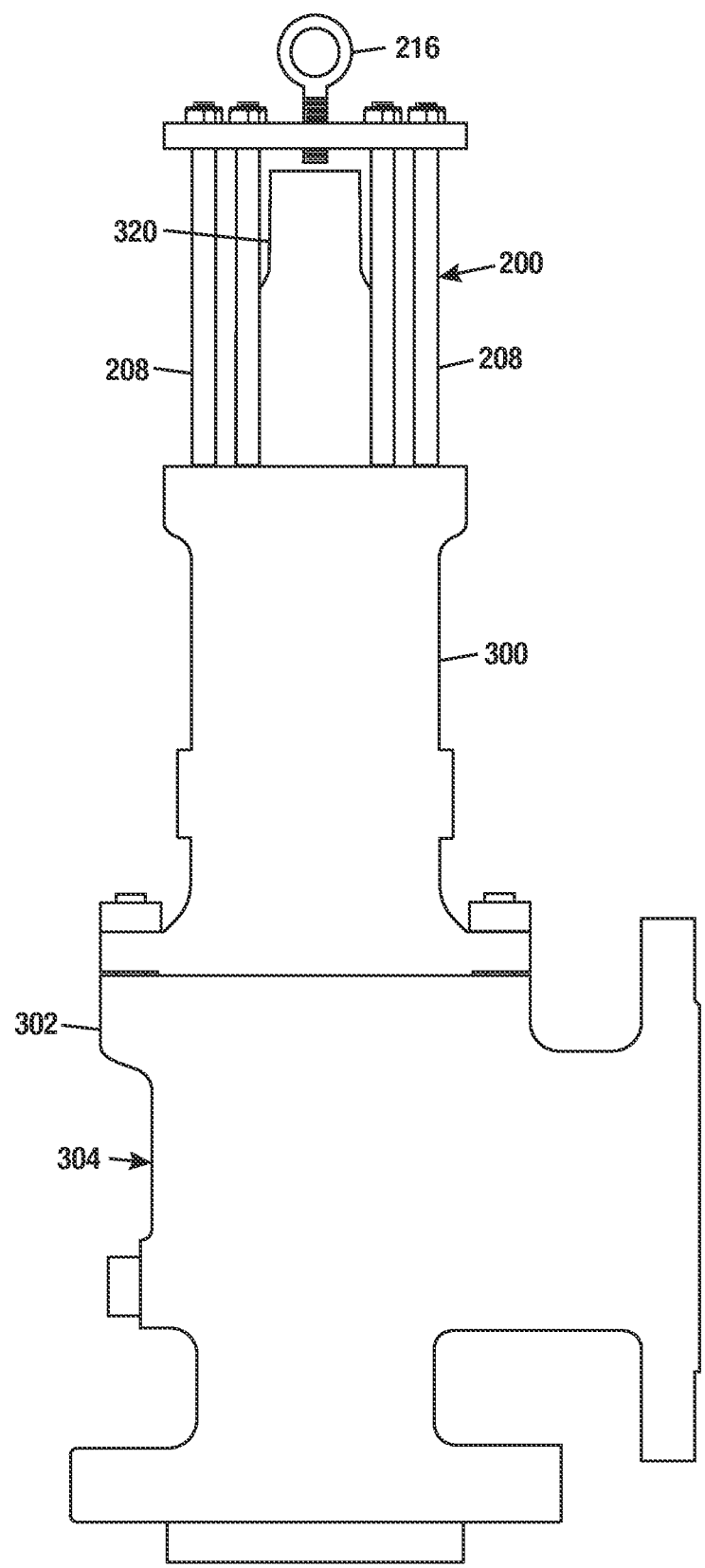
FIG. 2 is an elevated view of a valve assembly with an attached bonnet accessory.

FIG. 2 shows a bonnet accessory 200 according to one illustrative implementation releasably attached to a valve bonnet 300. In the illustrated example, valve bonnet 300 is mounted on a valve body 302 of a valve 304, which may be a conventional spring-loaded pressure relief valve such as shown in FIG. 1 or a balanced bellows pressure relief valve such as described in U.S. Patent Application Publication No. 2020/0271236 (Meshaikhis et al.) or other type of valve having a valve bonnet with a length to accommodate a spring-loaded valve stem. Bonnet accessory 200 provides a rigid point to which hoisting equipment may be coupled during installation or removal of valve 304 at a location or during assembly of valve 304.

Figure 3:
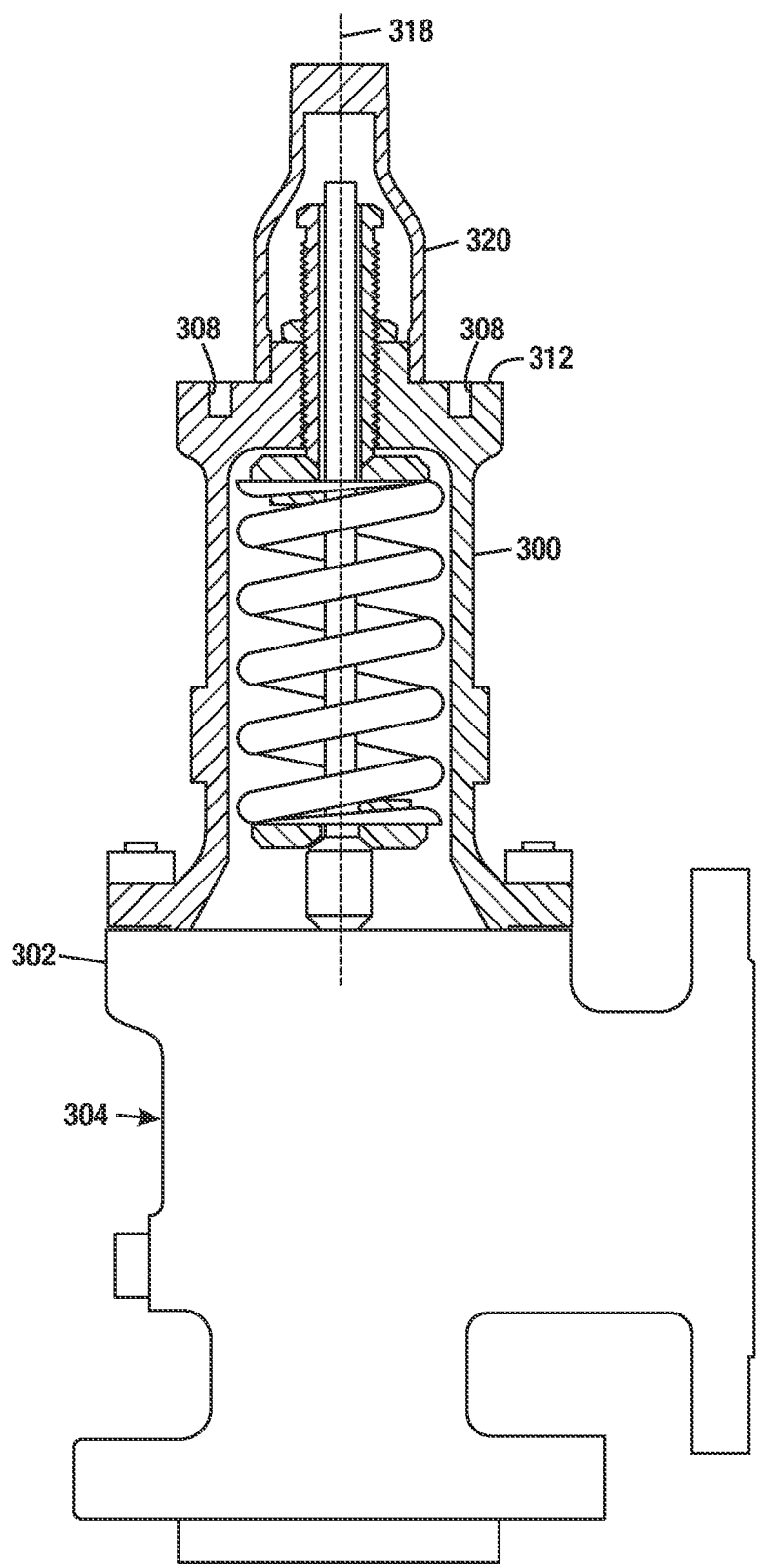
FIG. 3 is a partial cross-sectional view of the valve assembly shown in FIG. 2.
Figure 4:
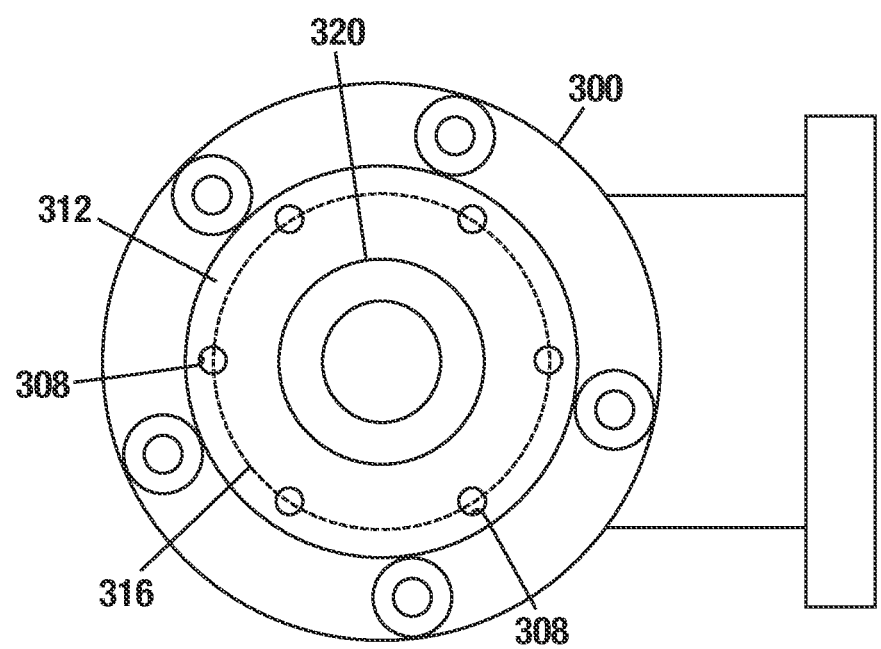
FIG. 4 is a top view of the valve assembly shown in FIG. 3.

For releasable attachment of bonnet accessory 200 to valve bonnet 300, valve bonnet 300 is provided with tapped holes that are exposed at an upper surface of the bonnet. FIG. 3 shows an example of tapped holes 308 formed in valve bonnet 300. Tapped holes 308 extend from an upper surface 312 of valve bonnet 300 to a depth within a top portion of bonnet 300. Tapped holes 308 are threaded holes. Tapped holes 308 may form a suitable hole pattern to uniformly distribute the weight of the valve when a pull force is applied to the bonnet accessory. For illustrative purposes, FIG. 4 shows tapped holes 308 forming a circular pattern 316, which may have a geometric center that is located on an axial axis (318 in FIG. 3) of valve bonnet 300. Preferably, the hole pattern formed by tapped holes 308 is balanced or symmetrical about the axial axis of the valve bonnet. The number of tapped holes 308 may be at least three, preferably at least four. In some cases, the number of tapped holes 308 may be in a range from four to eight. For illustrative purposes, six tapped holes 308 are shown in FIG. 4.

Figure 5:
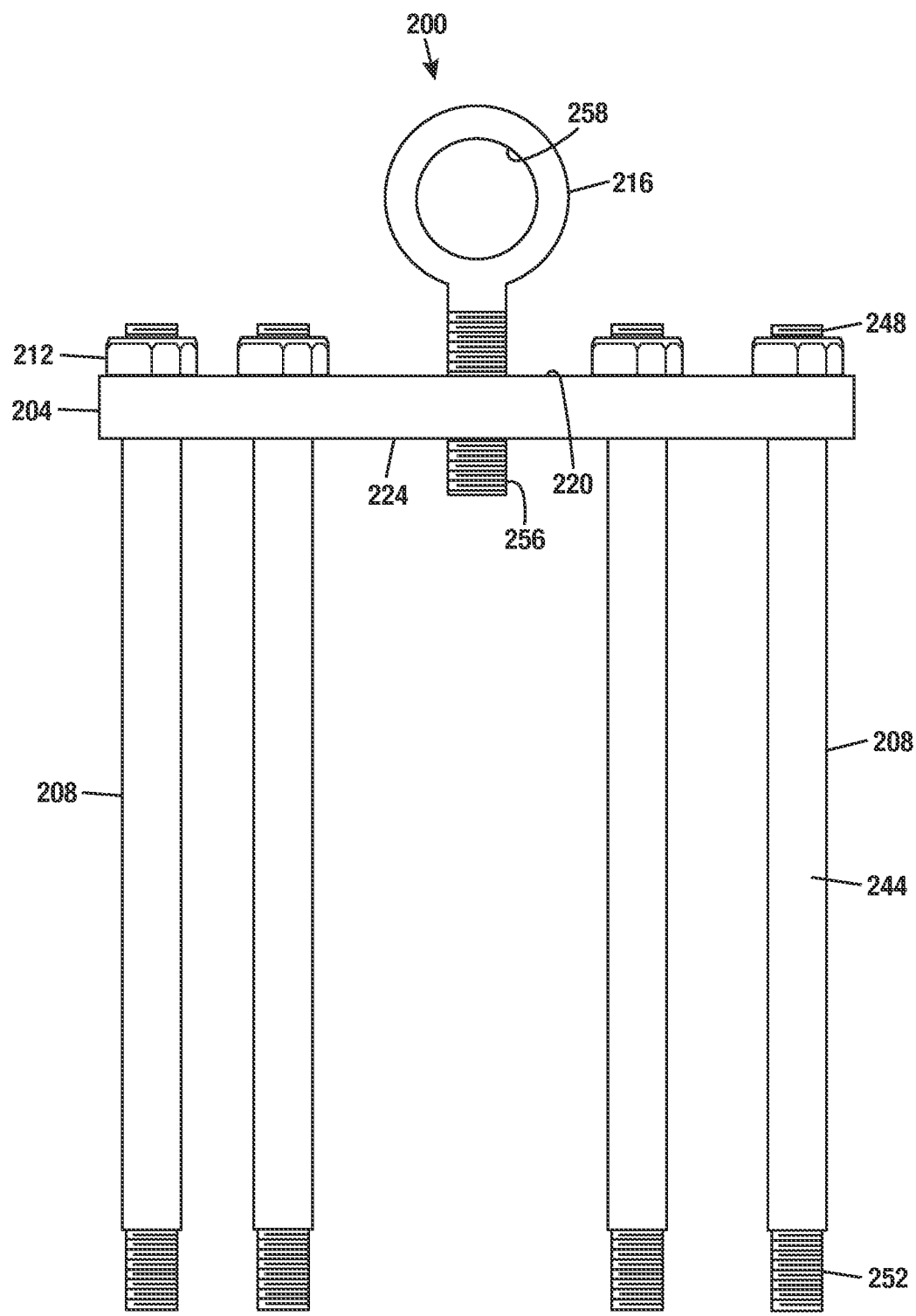
FIG. 5 is an elevated view of the bonnet accessory shown in FIG. 2.
Figure 6:
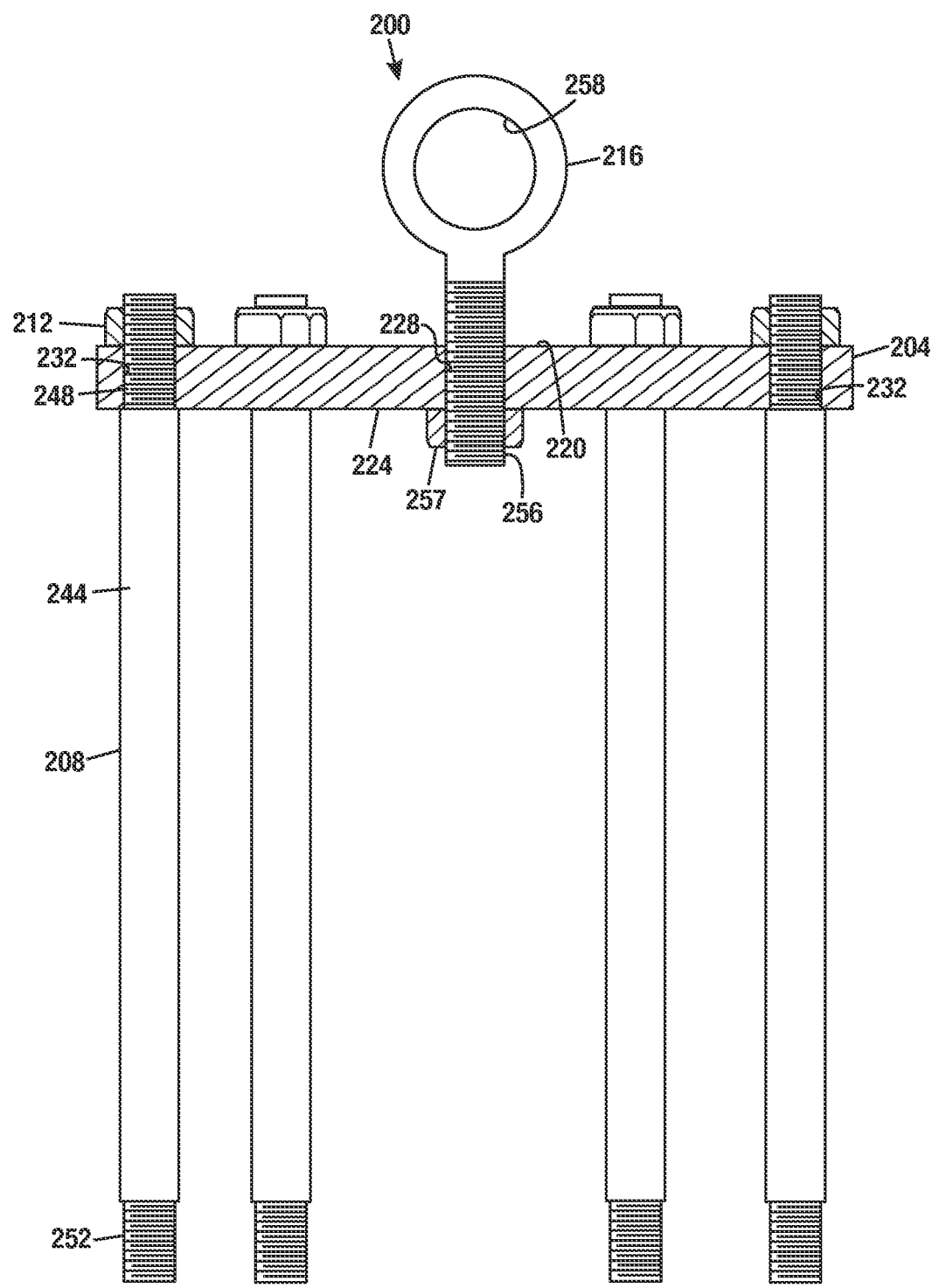
FIG. 6 is a cross-sectional view of the bonnet accessory shown in FIG. 5.
Figure 8:
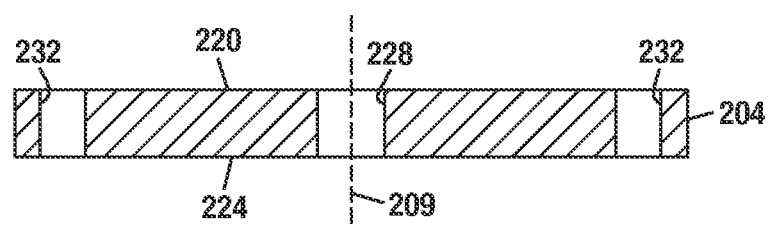
FIG. 8 is a cross-sectional view of the fixture plate of FIG. 7 along line 8-8.
Figure 9:
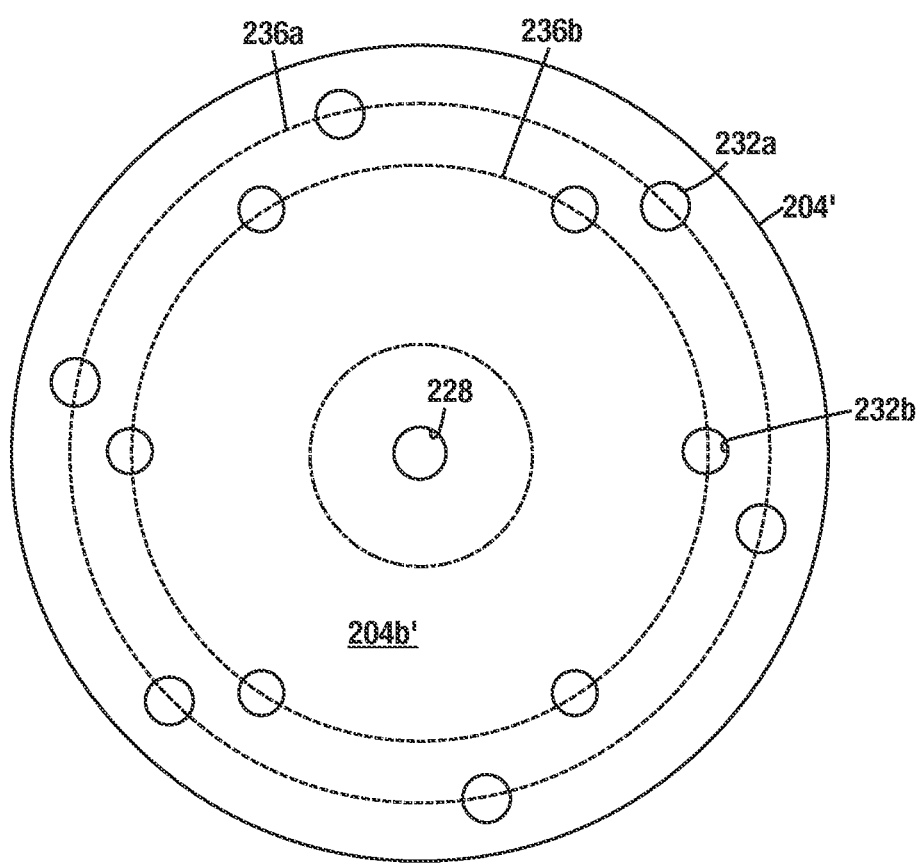
FIG. 9 is a top view of an alternative fixture plate.

Referring to FIGS. 5 and 6, bonnet accessory 200 includes a fixture plate 204, a plurality of threaded fasteners 208, and a loop fastener 216. As shown more clearly in FIGS. 7 and 8, fixture plate 204 has a top surface 220 and a bottom surface 224 separated by an axial thickness of plate material. The plate material and the thickness of fixture plate 204 may be selected such that fixture plate 204 has sufficient rigidity, without adding unnecessary weight to the valve, when in use. In a non-limiting example, fixture plate 204 may be made of mild steel (or low carbon steel), and the thickness of fixture plate 204 may be in a range from 0.75 inches to 1.5 inches. In one example, fixture plate 204 has a generally circular shape. In other examples not shown, slots may be cut into the fixture plate such that the fixture plate has radial webs emanating from a central hub. In one example, an inner area 204a and an outer area 204b may be identified on fixture plate 204. Fictitious line 207 separates inner area 204a from 204b. Inner area 204a is located in a central region of fixture plate 204, and outer area 204b circumscribes inner area 204a. A plurality of holes 232 are formed in outer area 204b. Holes 232 are arranged to form a hole pattern 236 that matches the hole pattern of the valve bonnet to which the bonnet accessory is to be attached. In the illustrated example, the hole pattern 236 is a circular pattern. In some cases, the hole pattern 236 is symmetrical. For example, the arrangement of holes 232 may be such that a polygon 240 having vertices at holes 232 is symmetrical, e.g., symmetrical about at least one plane that intersects top and bottom surfaces 220, 224 of fixture plate 204 (or cuts across the axial thickness of fixture plate 204). In some cases, holes may be formed in outer area 204b to provide multiple hole patterns, where each of the hole patterns may match a hole pattern on a specific design of valve bonnet. In FIG. 9, an example of holes 232a, 232b forming multiple patterns 236a, 236b in outer area 204b' of fixture plate 204' is shown.

Returning to FIGS. 5 and 6, each threaded fastener 208 may be a double ended stud including a rod 244 with an upper threaded end portion 248 and a lower threaded end portion 252. Lower threaded end portions 252 mate with tapped holes in the valve bonnet when the bonnet accessory is attached to the valve bonnet. In this case, the thread size of lower threaded end portions 252 will need to match the thread size of the tapped holes. Upper threaded end portions 248 are aligned with holes 232 (in FIG. 6) in fixture plate 204. In some cases, upper threaded end portions 248 extend through holes 232 and are retained on fixture plate 204 by means of nuts 212. The thread size of upper threaded end portions 248 and lower threaded end portions 252 may be the same or may be different. In one non-limiting example, the thread size of upper threaded end portions 248 and lower threaded end portions 252 may be ¾" UNC thread. The length of each threaded fastener 208 is selected to position fixture plate 204 at a predetermined height above the upper surface of the valve bonnet. In general, the length of each threaded fastener 208 is selected such that fixture plate 204 is as close to the top of valve bonnet as practical. In the example shown in FIG. 2, a cap 320 is installed on top of valve bonnet 300. For this example, the length of each threaded fastener 208 would need to position fixture plate 204 above cap 320. In one non-limiting example, based on a conventional spring-loaded pressure relief valve, the length of each threaded fastener 208 may be about 14 inches. In some cases, the length of each threaded fastener 208 may be in a range from 12 inches to 20 inches (or from 30 cm to 51 cm).

Figure 7:
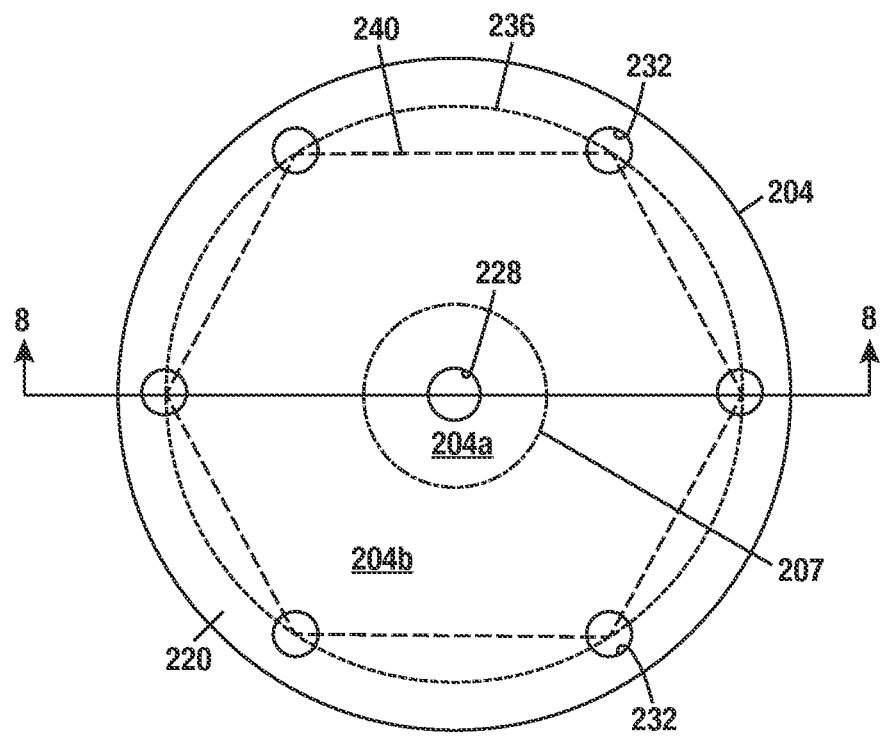
FIG. 7 is a top view of a fixture plate of the bonnet accessory shown in FIG. 2.

Returning to FIGS. 5 and 6, in one example, loop fastener 216 is an eye bolt having a threaded stem portion 256 and a loop portion 258. However, loop fastener 216 is not limited to an eye bolt, and any fastener that provides a loop may be used. The loop provides a connection point for hoisting equipment. For example, a shackle of hoisting equipment may be engaged with the loop portion of the loop fastener. To install loop fastener 216 on fixture plate 204, a hole 228 is provided in inner area 204a of fixture plate 204, as shown in FIGS. 7 and 8. Hole 228 may be located at a geometric center of fixture plate 204, or on an axial axis (209 in FIG. 8) of fixture plate 204, in some cases. Where loop fastener 216 has a threaded stem portion, hole 228 may be a threaded hole to threadedly engage the threaded stem portion. For other types of loop fasteners, more than one hole may be needed in inner area 204a for installation of the loop fastener. FIGS. 5 and 6 show loop fastener 216 threadedly engaged with hole 228. Optionally, a nut 257 may be threaded onto threaded stem portion 256 to ensure that loop fastener 216 will not separate from fixture plate 204 when a pull force is applied to the loop fastener in order to lift the valve bonnet and any attached valve parts.

Figure 10A:
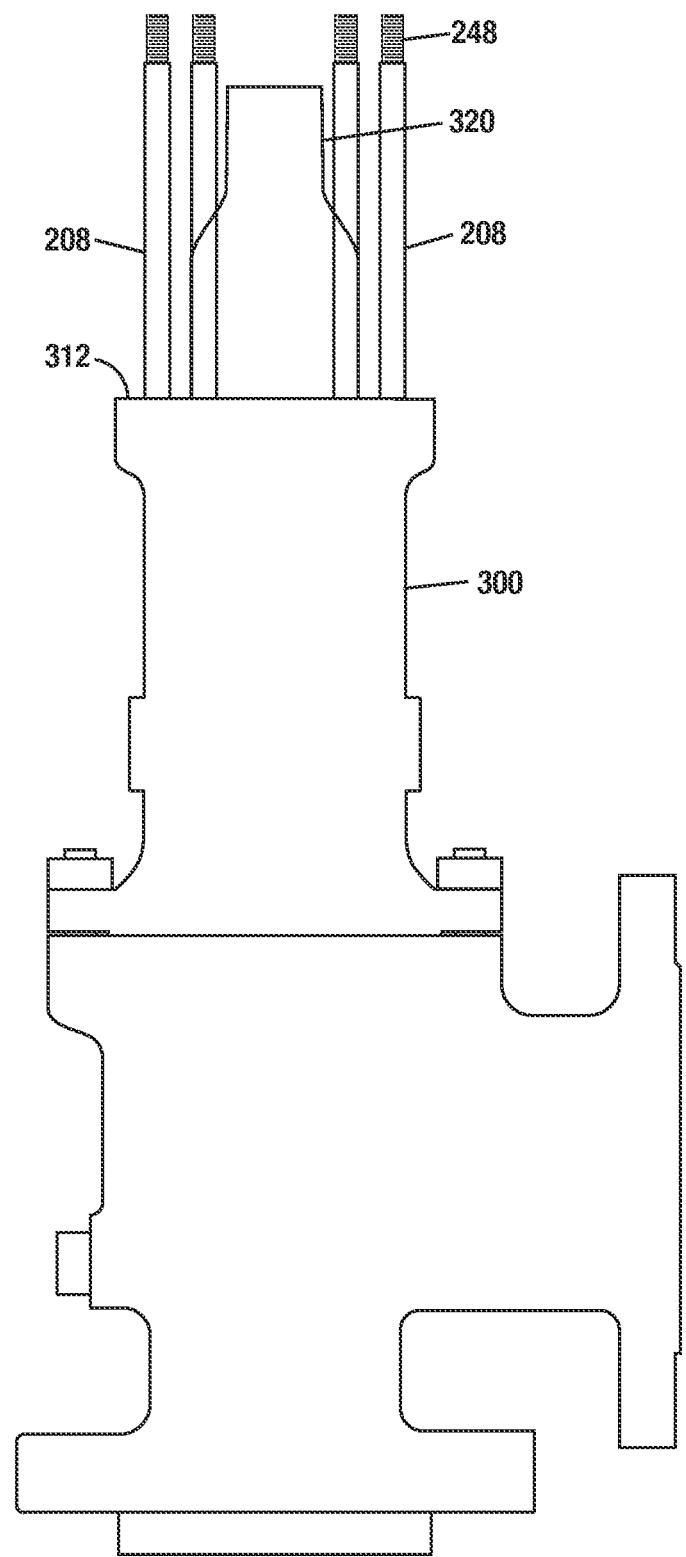
FIGS. 10A-10D illustrate a process of installing the bonnet accessory of FIGS. 5 and 6 on a valve bonnet.
Figure 10B:
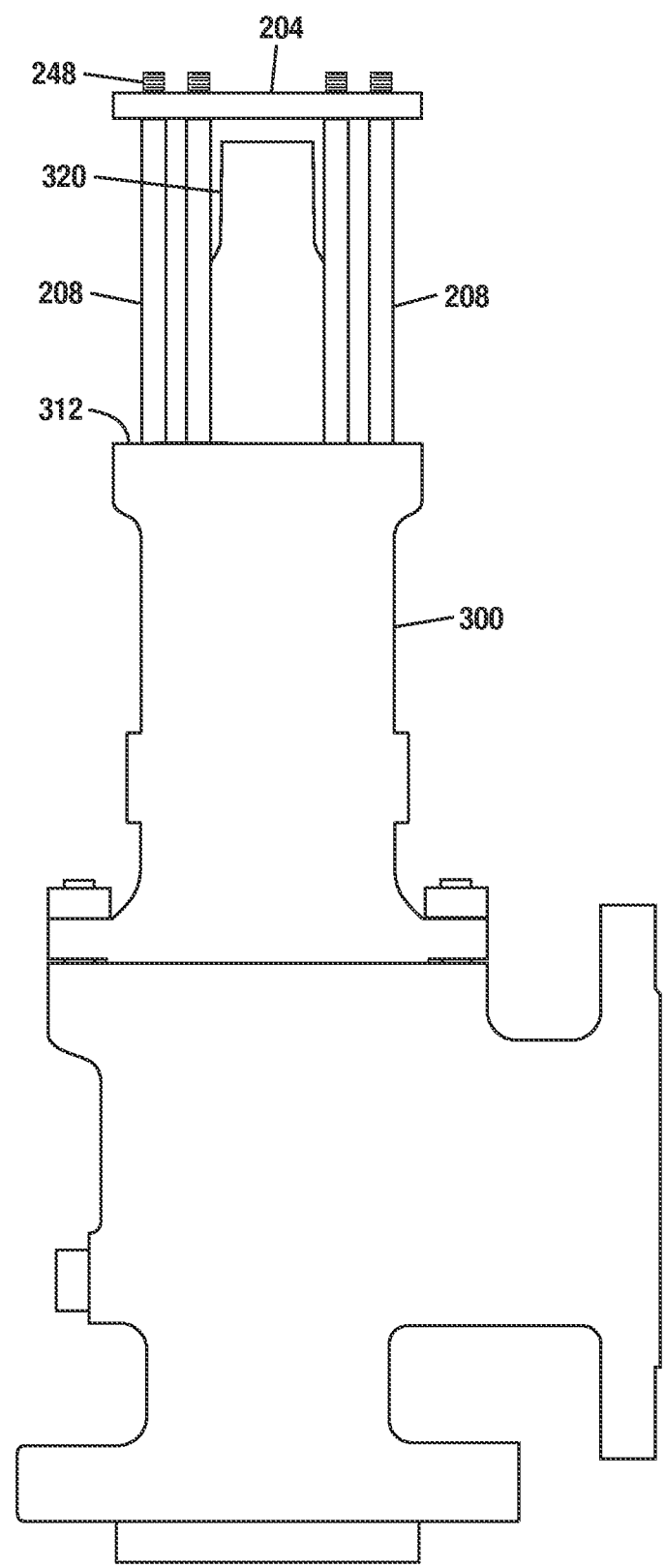
Figure 10C:
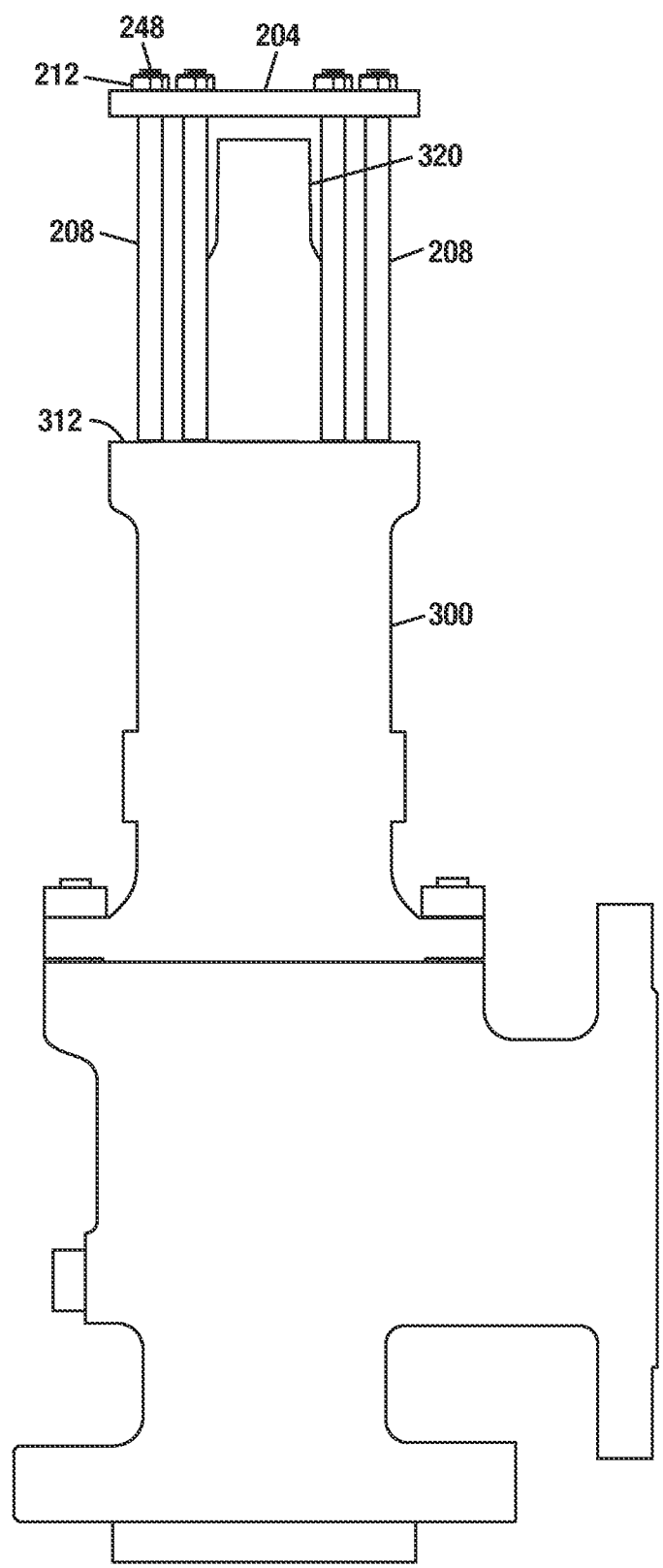
Figure 10D:
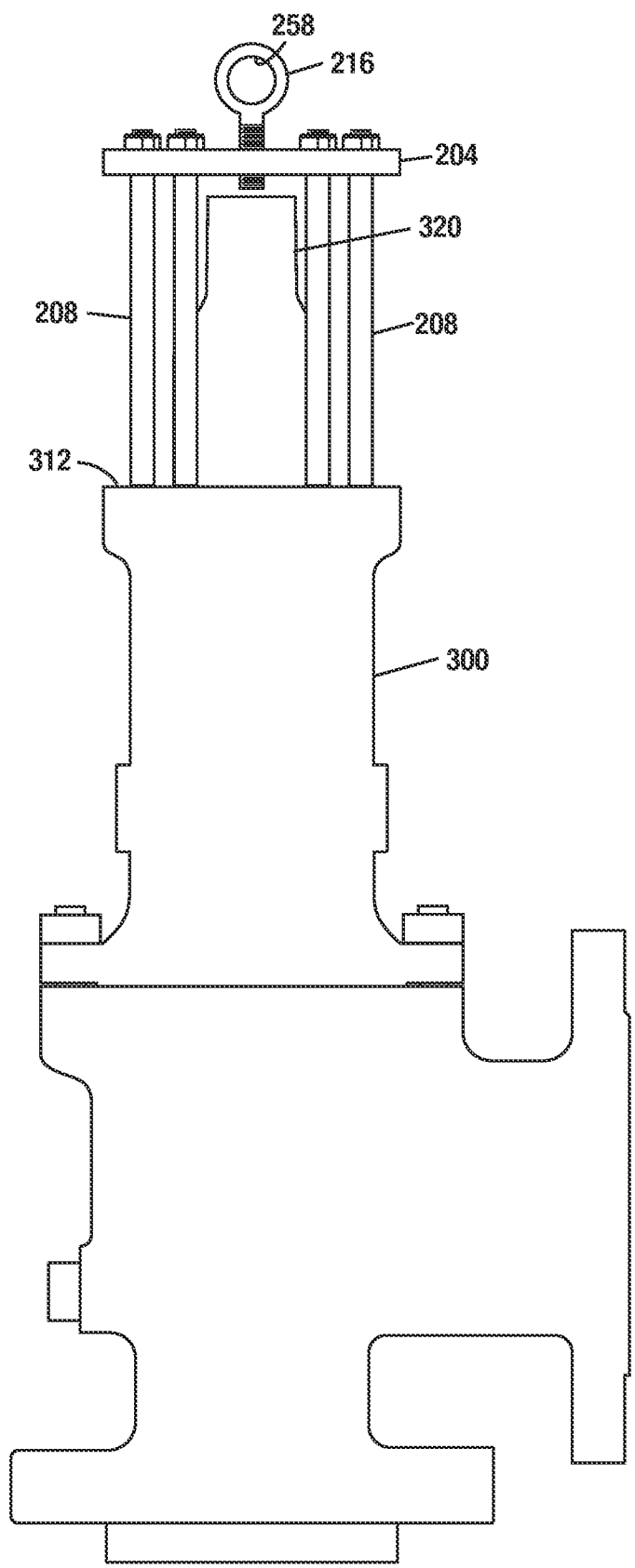

FIGS. 10A-10D illustrate installation of the bonnet accessory on a valve bonnet. In FIG. 10A, lower threaded end portions (252 in FIGS. 5 and 7) of threaded fasteners 208 are mated with tapped holes (308 in FIGS. 3 and 4) in valve bonnet 300. Threaded fasteners 208 extend upwardly from upper surface 312 of valve bonnet 300 and alongside cap 320, with upper threaded end portions 248 of threaded fasteners 208 projecting above the cap. In FIG. 10B, upper threaded end portions of threaded fasteners 208 are inserted into outer area holes (232 in FIGS. 6-8) in fixture plate 204. In FIG. 10C, nuts 212 are installed on upper threaded end portions 248 of threaded fasteners 208, retaining threaded fasteners 208 on fixture plate 204. In FIG. 10D, loop fastener 216 is installed in inner area hole (228 in FIGS. 6-8) of fixture plate 204. The installation may include making up a threaded connection between loop fastener 216 and the inner area hole of fixture plate 204. When loop fastener 216 is installed, the loop portion 258 of loop fastener 216 projects above a center region of fixture plate 204, providing a connection point of the bonnet accessory. In one example, the bonnet accessory is installed as described in FIGS. 10A-10D. Then, hoisting equipment is engaged with the connection point provided by loop portion 258 of loop fastener 216. This may include, for example, inserting a shackle or other type of anchor in the loop portion.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:
1. A method comprising:
   threadedly engaging first ends of a plurality of threaded fasteners with a plurality of tapped holes exposed at an upper surface of a valve bonnet with an elongated cavity;
   aligning a plurality of holes formed in a fixture plate with second ends of the plurality of threaded fasteners;

positioning the fixture plate at a predetermined height above the upper surface of the valve bonnet such that:
the fixture plate does not contact the upper surface of the valve bonnet; and
the fixture plate is positioned above a cap that extends above the upper surface of the valve bonnet;
installing a plurality of nuts on the second ends of the plurality of threaded fasteners to retain the second ends on the fixture plate; and
attaching a loop fastener to the fixture plate to position a loop portion of the loop fastener above a center region of the fixture plate.

2. The method of claim 1, further comprising applying a pull force to the loop portion of the loop fastener to lift the valve bonnet and any valve parts attached to the valve bonnet.

3. A bonnet accessory comprising:
a fixture plate that in use is positioned above an upper surface of a valve bonnet having a plurality of tapped holes exposed at the upper surface and an elongated cavity, the fixture plate having an inner area and an outer area circumscribing the inner area, the outer area having a plurality of outer area holes formed therein, at least a number of the plurality of outer area holes arranged to form a predetermined hole pattern matching a hole pattern of the plurality of tapped holes;
a plurality of threaded fasteners each having a length to position the fixture plate at a predetermined height above the upper surface of the valve bonnet such that:
the fixture plate does not contact the upper surface of the valve bonnet; and
the predetermined height is selected to position the fixture plate above a cap that extends above the upper surface of the valve bonnet;
the plurality of threaded fasteners having first ends to threadedly engage the plurality of tapped holes and second ends aligned with the outer area holes and retained on the outer area of the fixture plate; and
a loop fastener retained on the inner area of the fixture plate and having a loop portion positioned above the fixture plate.

4. The bonnet accessory of claim 3, wherein the loop fastener is an eye bolt.

5. The bonnet accessory of claim 3, wherein the inner area has at least one inner area hole formed therein, and wherein the loop fastener has a stem portion threadedly engaged with the at least one inner area hole.

6. The bonnet accessory of claim 5, wherein the at least one inner area hole is located on an axial axis of the fixture plate.

7. The bonnet accessory of claim 3, wherein the predetermined hole pattern is a circular pattern.

8. The bonnet accessory of claim 3, wherein the predetermined hole pattern is symmetrical about a plane intersecting the fixture plate.

9. The bonnet accessory of claim 3, wherein the fixture plate has a circular shape.

10. The bonnet accessory of claim 3, wherein the second ends of the threaded fasteners are inserted through the outer area holes, and further comprising a plurality of nuts threadedly engaged with the second ends to retain the second ends on the outer area of the fixture plate.

11. The bonnet accessory of claim 3, wherein the length of each of the plurality of threaded fasteners is in a range from 12 inches to 20 inches.

12. An assembly comprising:
a valve bonnet having an elongated cavity to accommodate a spring-loaded valve stem, the valve bonnet having an upper surface and a plurality of tapped holes exposed at the upper surface;
the valve bonnet further including a cap that extends above the upper surface of the valve bonnet;
a bonnet accessory releasably attached to the valve bonnet, the bonnet accessory comprising:
a fixture plate having an inner area and an outer area circumscribing the inner area, the outer area having a plurality of outer area holes formed therein, at least a number of the plurality of outer area holes arranged to form a predetermined hole pattern matching a hole pattern of the plurality of tapped holes;
a plurality of threaded fasteners each having a length that positions the fixture plate at a predetermined height relative to the upper surface of the valve bonnet such that:
the fixture plate does not contact the upper surface of the valve bonnet; and
the predetermined height is selected to position the fixture plate above the cap of the valve bonnet;
the plurality of threaded fasteners having first ends threadedly engaged with the tapped holes and second ends aligned with the outer area holes and retained on the outer area of the fixture plate; and
a loop fastener retained on the inner area of the fixture plate and having a loop portion positioned above the fixture plate.

13. The assembly of claim 12, wherein the loop fastener is an eye bolt.

14. The assembly of claim 12, wherein the inner area has at least one inner area hole formed therein, and wherein the loop fastener has a stem portion threadedly engaged with the at least one inner area hole.

15. The assembly of claim 12, wherein the predetermined hole pattern is a circular pattern.

16. The assembly of claim 12, wherein the predetermined hole pattern is symmetrical about a plane intersecting the fixture plate.

17. The assembly of claim 12, wherein the fixture plate has a circular shape.

18. The assembly of claim 12, wherein:
the cap is coupled to the valve bonnet; and
the cap covers an adjusting screw which adjusts compression of a spring in the spring-loaded valve stem.

19. The assembly of claim 12, wherein the second ends of the threaded fasteners are inserted through the outer area holes, and further comprising a plurality of nuts threadedly engaged with the second ends to retain the second ends on the outer area of the fixture plate.

20. The assembly of claim 12, wherein the valve bonnet is coupled to a valve body of a spring-loaded pressure relief valve.

\* \* \* \* \*